US009860238B2

United States Patent
Shen

(10) Patent No.: US 9,860,238 B2
(45) Date of Patent: Jan. 2, 2018

(54) SMART REMOTE CONTROL SYSTEM

(71) Applicant: NETVOX TECHNOLOGY CO., LTD., Tainan (TW)

(72) Inventor: Shiu-Cheng Shen, Tainan (TW)

(73) Assignee: Netvox Technology Co., Ltd., Tainan (TW)

( * ) Notice: Subject to any disclaimer, the term of this patent is extended or adjusted under 35 U.S.C. 154(b) by 150 days.

(21) Appl. No.: 14/941,260

(22) Filed: Nov. 13, 2015

(65) Prior Publication Data

US 2016/0142509 A1 May 19, 2016

(30) Foreign Application Priority Data

Nov. 14, 2014 (TW) .............................. 103220309 U

(51) Int. Cl.
| | |
|---|---|
| *H04L 29/06* | (2006.01) |
| *G06F 21/50* | (2013.01) |
| *G08C 17/02* | (2006.01) |
| *G06F 21/30* | (2013.01) |
| *H04L 29/08* | (2006.01) |

(52) U.S. Cl.
CPC .......... *H04L 63/083* (2013.01); *G06F 21/305* (2013.01); *G06F 21/50* (2013.01); *G08C 17/02* (2013.01); *G08C 2201/61* (2013.01); *H04L 67/306* (2013.01)

(58) Field of Classification Search
CPC ... H04L 63/083; H04L 63/306; G06F 21/335; G08C 17/02; G08C 2201/61
See application file for complete search history.

(56) References Cited

U.S. PATENT DOCUMENTS

| | | | | |
|---|---|---|---|---|
| 6,975,852 | B1* | 12/2005 | Sofer ................. | H04L 12/2854 370/349 |
| 8,930,576 | B1* | 1/2015 | Roberts .............. | H04L 63/0263 700/3 |
| 2009/0172795 | A1* | 7/2009 | Ritari ................. | H04L 63/0815 726/7 |
| 2010/0299523 | A1* | 11/2010 | Henry ................. | G06Q 40/00 713/168 |
| 2012/0137130 | A1* | 5/2012 | Vainstein ............ | H04L 63/102 713/165 |

(Continued)

FOREIGN PATENT DOCUMENTS

| | | | | |
|---|---|---|---|---|
| KR | 1020130128719 | * | 10/2013 | ........... H04L 63/101 |
| WO | WO 0249235 A1 | * | 6/2002 | ............. G07B 15/04 |

*Primary Examiner* — Hadi Armouche
*Assistant Examiner* — Sher A Khan
(74) *Attorney, Agent, or Firm* — Muncy, Geissler, Olds & Lowe, P.C.

(57) ABSTRACT

A smart remote control system includes multiple terminals and a server. Each terminal is accessible by an electronic device through use of a registered account/password set. Upon receipt of an association request and a to-be-associated account/password set, one of the terminals is operable to transmit the to-be-associated account/password set to the server. In turn, the server determines whether the to-be-associated account/password set conforms with one of a plurality of user account/password sets stored therein, and enables the one of the terminals to be accessible by the electronic device through use of the to-be-associated account/password set when the determination is affirmative.

6 Claims, 2 Drawing Sheets

(56) References Cited

U.S. PATENT DOCUMENTS

| | | | | |
|---|---|---|---|---|
| 2013/0086245 A1* | 4/2013 | Lu | ............................ | G05B 13/02 |
| | | | | 709/223 |
| 2014/0016911 A1* | 1/2014 | Hailey | ...................... | H04N 5/76 |
| | | | | 386/234 |
| 2014/0052974 A1* | 2/2014 | Masters | ................. | G01S 5/0027 |
| | | | | 713/1 |
| 2014/0164775 A1* | 6/2014 | Wu | ...................... | H04L 63/0428 |
| | | | | 713/171 |
| 2014/0181683 A1* | 6/2014 | Lim | ...................... | H04L 63/105 |
| | | | | 715/740 |
| 2014/0244001 A1* | 8/2014 | Glickfield | ............... | H04L 67/16 |
| | | | | 700/33 |
| 2015/0006696 A1* | 1/2015 | Hershberg | ............... | H04L 67/12 |
| | | | | 709/223 |
| 2015/0023183 A1* | 1/2015 | Ilsar | ...................... | H04W 48/16 |
| | | | | 370/244 |
| 2015/0058445 A1* | 2/2015 | Choi | ........................ | H04L 67/16 |
| | | | | 709/217 |
| 2015/0121470 A1* | 4/2015 | Rongo | .................... | H04L 63/10 |
| | | | | 726/4 |
| 2015/0140990 A1* | 5/2015 | Kim | ...................... | H04W 8/186 |
| | | | | 455/418 |
| 2016/0028856 A1* | 1/2016 | Kao | ......................... | H04L 67/16 |
| | | | | 709/203 |
| 2016/0081127 A1* | 3/2016 | Lee | ..................... | H04L 12/2809 |
| | | | | 709/228 |
| 2016/0174073 A1* | 6/2016 | Yu | ......................... | H04W 12/06 |
| | | | | 455/411 |
| 2016/0227371 A1* | 8/2016 | Wang | .................... | H04W 4/005 |
| 2016/0261600 A1* | 9/2016 | Bae | ........................ | H04L 9/3226 |

\* cited by examiner

SMART REMOTE CONTROL SYSTEM

CROSS-REFERENCE TO RELATED APPLICATION

This application claims priority of Taiwanese Application No. 103220309, filed on Nov. 14, 2014.

FIELD

The disclosure relates to a smart remote control system capable of monitoring and controlling a plurality of terminals that are disposed at separate locations.

BACKGROUND

The Internet of Things (IoT) network involves connecting a plurality of objects (e.g., household and/or commercial appliances) using a computer system and network connectivity.

Using the IoT network, a user operating a terminal (e.g., a remote controller) is able to control a plurality of appliances that is coupled to the terminal. For the purpose of security, the terminal may request the user to register an account/password set and input the account/password set in order to access the terminal. In case a plurality of individual terminals are present (e.g., one in an office, one in a house, etc.), the user typically registers the account/password set individually.

SUMMARY

The object of the disclosure is to provide a smart remote control system that can allow the user to register an account/password set in one of the terminals, and subsequently use that account/password set to access other terminals.

According to the disclosure, the smart remote control system includes a plurality of terminals and a server coupled to the terminals.

The terminals are programmed to communicate with an electronic device. Each of the terminals is configured to be coupled to an appliance and to store a registered account/password set therein. Each of the terminals is accessible by the electronic device through use of the registered account/password set so as to allow the electronic device to control and monitor the appliance.

The server coupled to the terminals, and is programmed to store a plurality of user account/password sets associated with the terminals, respectively.

A requesting one of said terminals is operable, upon receipt of an association request and a to-be-associated account/password set from the electronic device, to transmit an association signal and the to-be-associated account/password set to the server.

The server is operable, upon receipt of the association signal and the to-be-associated account/password set, to determine whether the to-be-associated account/password set conforms with one of the user account/password sets stored therein, and to perform an association operation so as to enable the requesting one of the terminals to be accessible by the electronic device through use of the to-be-associated account/password set when the determination is affirmative.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
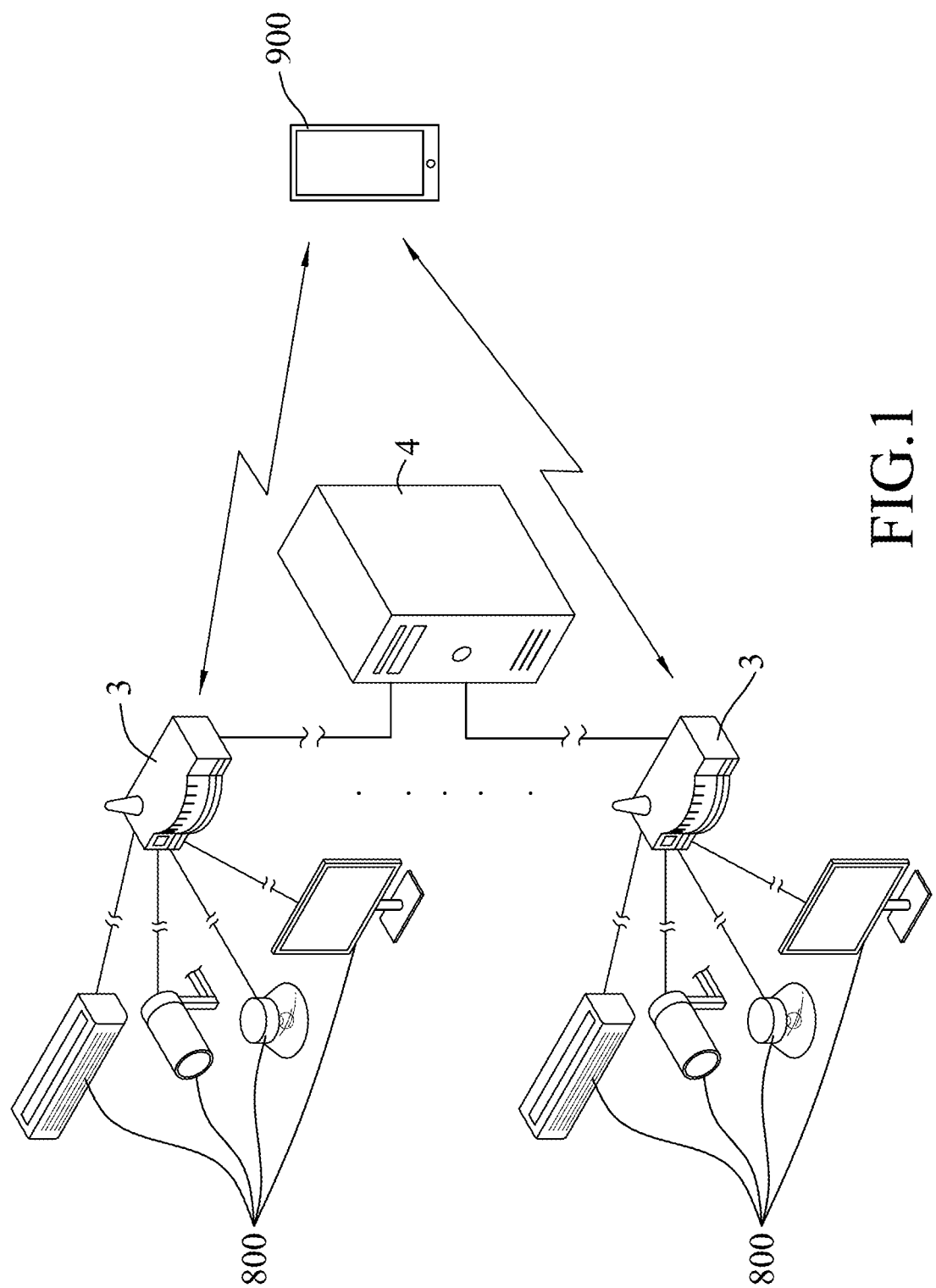
FIG. 1 illustrates a smart remote control system coupled to a plurality of appliances, according to one embodiment of the disclosure.

FIG. 1 illustrates a smart remote control system according to one embodiment of the disclosure. The smart remote control system includes a plurality of terminals 3 and a server 4. Each of the terminals 3 is configured to communicate with the server 4 using, for example, wireless communication, such as the Internet or a mobile communication network, and may be disposed at separate locations. For example, in this embodiment, one of the terminals 3 is located in Beijing, another one of the terminals 3 is located in Shanghai, and yet another one of the terminals 3 is located in Taipei City.

Each of the terminals 3 is to be coupled to at least one appliance 800 via wired or wireless communication. In this embodiment, the appliance 800 may be embodied using, for example, an access control device such as a door security system, an automatic door/window, an air conditioning control system, etc.

Each of the terminals 3 is operable to communicate with an electronic device 900 using wireless communication. In this embodiment, the electronic device 900 may be embodied using a portable device, and is operated by a user for monitoring and controlling the appliances 800 via the terminals 3.

Figure 2:
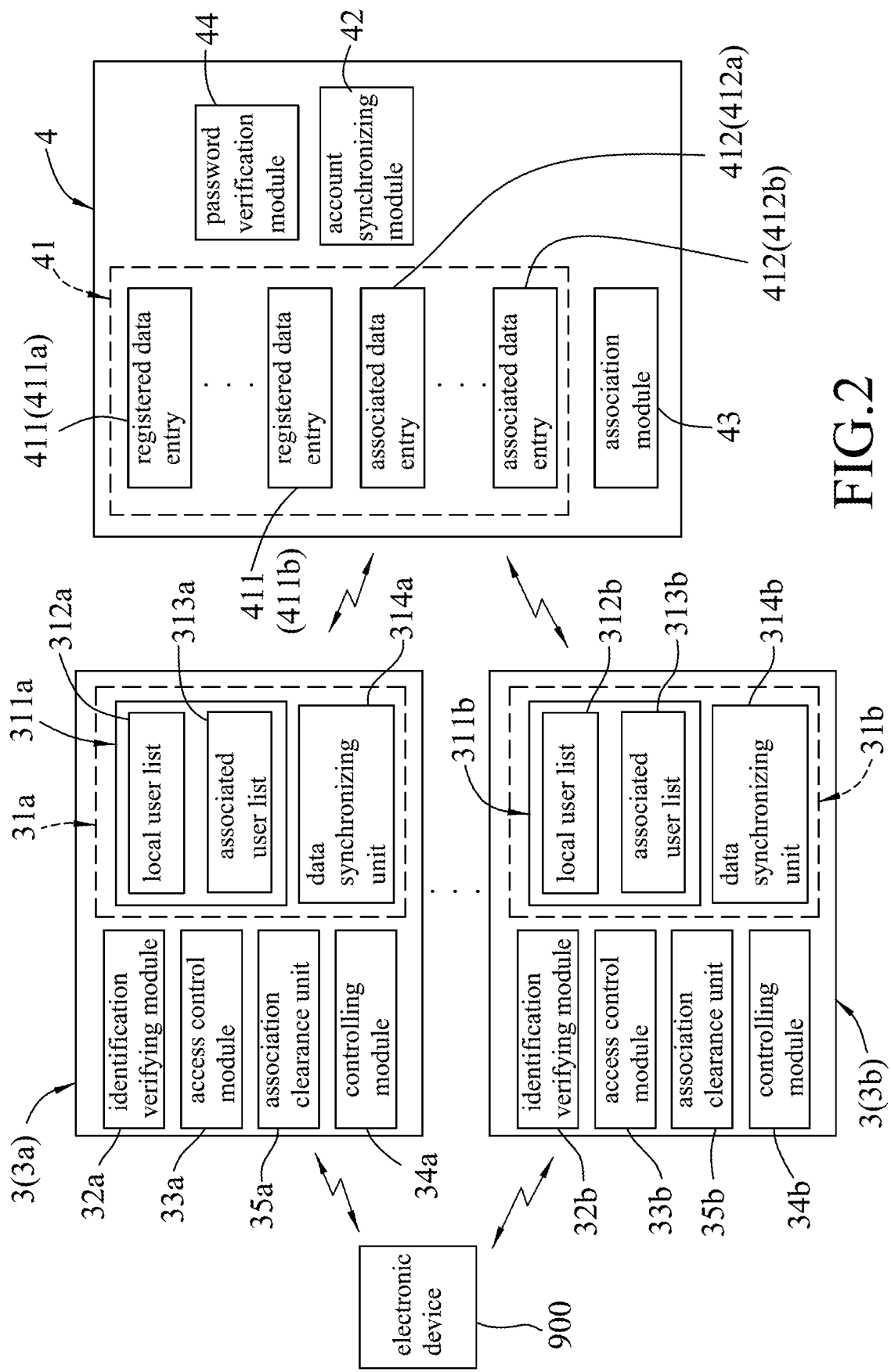
FIG. 2 is a block diagram illustrating the smart remote control system according to one embodiment of the disclosure.

As shown in FIG. 2, in this embodiment, two terminals 3a and 3b are depicted. Each of the terminals 3a and 3b includes a registration module 31a, 31b, an identification verifying module 32a, 32b, an access control module 33a, 33b, a controlling module 34a, 34b, and an association clearance unit 35a, 35b.

It is noted that, since the structures and operations of the terminals 3a and 3b are similar to each other, the following descriptions will focus on the terminal 3a for the sake of brevity.

The registration module 31a of the terminal 3a includes a user storage unit 311a and a data synchronizing unit 314a. The registration module 31a is programmed to allow user input for creation of a registered account/password set, to store the registered account/password set in the user storage unit 311a, and to transmit the registered account/password set to the server 4. Note that the registration module 31 of each terminal 3 may allow for storage of multiple registered account/password sets, but for the sake of simplicity of illustration, it is assumed herein that the registration module 31 of each terminal 1 only stores one corresponding registered account/password set.

In particular, the user storage unit 311a includes a local user list 312a and an associated user list 313a. When the registration module 31a receives user input for creation of the registered account/password set, the created registered account/password set is stored in the local user list 312a. It is noted that, the operation regarding the creation of the registered account/password set may be done by a user directly operating the terminal 3a, or the user operating the electronic device 900 that is connected to the terminal 3a.

After a registered account/password set is created, the data synchronizing unit 314a transmits the registered account/password set to the server 4.

The identification verifying module 32a is programmed to generate a verifying code. The identification verifying module 32a, 32b of each of the terminals 3a and 3b is programmed to generate the verifying code using different algorithms, and when a verifying code is received by the server 4, the server 4 may be capable of determining whether the verifying code is authentic and by which terminal 3a, 3b the verifying code is generated.

The access control module 33a is programmed to, when an access request and a user-input account/password set is received (e.g., from the electronic device 900), determine whether the user-input account/password set conforms with the registered account/password set stored in the local user list 312a of the user storage unit 311a. When the determination is affirmative, the access control module 33a enables the electronic device 900 to access the terminal 3a.

The controlling module 34a is for controlling and monitoring the appliance(s) 800 (see FIG. 1) coupled to the terminal 3a.

The server 4 includes a storage module 41, an account synchronizing module 42 and an association module 43.

The storage module 41 has a plurality of registered data entries 411 associated respectively with the terminals 3 for storing corresponding user account/password sets, and a plurality of associated data entries 412 associated respectively with the terminals 3. Specifically, in this embodiment, two registered data entries 411a and 411b are depicted for storing respectively the user account/password sets that are associated with the terminals 3a and 3b, and two associated data entries 412a and 412b are associated respectively with the terminals 3a and 3b.

One function that can be performed by the smart remote control system is to allow a particular user to be able to access a plurality of terminals 3 using only one account/password set. In order to achieve the effect, an association process may be executed.

Before the association process, the user operating the electronic device 900 is required to create an account/password set with one of the terminals 3 (e.g., the terminal 3a). The account/password set includes a user account number (e.g., "u0001") and a user password (e.g., "1234").

This account/password set is stored in the local user list 312a to serve as a registered account/password set, and transmitted to the server 4 to be stored in the registered data entry 411a to serve as a user account/password set.

Afterward, in the association process, the user may attempt to enable the terminal 3b, which is not stored with this particular account/password set in the local user list 311b thereof, to be accessible using this account/password set. As such, the user operates the electronic device 900 to connect to the terminal 3b, and to transmit an association request and the account/password set, serving as a to-be-associated account/password set, to the registration module 31b of the terminal 3b.

In response, the identification verifying module 32b generates a verifying code, and sends an instruction via the access control module 33b to the electronic device 900, asking the user to input the verifying code (which may be displayed by the electronic device 900).

Afterward, the access control module 33b receives a user-input code from the electronic device 900, and transmits the user-input code, the verifying code, an association signal and the to-be-associated account/password set to the server 4.

In response to receipt of the association signal, the server 4 determines whether the user-input code conforms with the verifying code, and whether the verifying code is generated by the terminal 3b. Furthermore, the server 4 determines whether the to-be-associated account/password set conforms with the user account/password set stored in the registered data entry 411a, in order to ensure that the to-be-associated account/password is already stored in the server 4.

When the above determinations are affirmative, the server 4 performs an association operation, so as to enable the terminal 3b to be accessible by the electronic device 900 through use of the to-be-associated account/password set.

Specifically, in the association operation, the association module 43 associates the to-be-associated account/password set with the terminal 3b, and an account synchronizing module 42 of the server 4 stores the to-be-associated account/password set in the associated data entry 412b as a linked account/password set that is associated with the terminal 3b, from which the server 4 receives the to-be-associated account/password set.

Furthermore, the server 4 is programmed to enable the registration module 31b of the terminal 3b to store the to-be-associated account/password set as an associated account/password set. This may be done by the server 4 controlling the terminal 3b to store the to-be-associated account/password set in the associated user list 313b. It is noted that in other embodiments, the server 4 may transmit the to-be-associated account/password set back to the terminal 3b and control the terminal 3b to store the to-be-associated account/password set in the associated user list 313b.

Thereafter, the terminal 3b may be accessible by the electronic device 900 through use of the associated account/password set. Accordingly, the access control module 33 of each of the terminals 3 is programmed to, when an access request and a user-input account/password set is received, determine whether the user-input account/password set conforms with any of the registered account/password set stored in the local user list 312 and the associated account/password set stored in the associated user list 313 thereof, and when the determination is affirmative, the access control module 33 enables the electronic device 900 to access the terminal 3.

On the other hand, during the association process, when the user-input code does not conform with the verifying code, and/or when the to-be-associated account/password set does not conform with the user account/password set stored in the registered data entry 411a), the server 4 transmits an error message to the terminal 3b, which in turn notifies the electronic device 900 that the to-be-associated account/password is not stored in the server 4 and/or that the user-input code inputted by the user does not conform with the verifying code generated by the identification verifying module 32b.

The association clearance unit 35 of each of the terminals 3 is utilized in the case that the user intends to disallow the use of any account/password set to access a particular one of the terminals (e.g., the terminal 3b). Specifically, when activated, the association clearance unit 35b of the terminal 3b is programmed to delete the associated account/password set stored in the user storage unit 311b, and to transmit an association clearance signal to the account synchronizing module 42 of the server 4. Upon receipt of the association clearance signal, the account synchronizing module 42 deletes the linked account/password set stored in the associated data entry 412b associated with the terminal 3b.

The smart remote control system also allows a user to update his/her registered account/password set for one of the terminals 3 through use of the electronic device 900 connected to the one of the terminals 3.

In one example, the user has created a registered account/password set on the terminal 3a, and while being connected to the terminal 3a, intends to update the registered account/password set. As a result, the electronic device 900 transmits to the terminal 3a an update request, indicating a request for updating the registered account/password set, and an updated account/password set.

In response, the data synchronizing unit 314a transmits to the account synchronizing module 42 of the server 4 an update signal including the updated account/password set. Afterward, the account synchronizing module 42 stores the updated account/password set as the user account/password set in the registered data entry 411a that is associated with the terminal 3a, stores the updated account/password set as the linked account/password set in the associated data entry (entries) 411 that is (are) associated with one or more terminals 3, with which the association operation has been performed for the registered account/password set of the terminal 3a, and transmits the update signal to one or more of the terminals 3 (e.g., the terminal 3b), with which the association operation has been performed for the registered account/password set. In this way, when the registered account/password set is updated, the server 4 and the one or more other terminals 3 (e.g., the terminal 3b) with which the association operation has been performed will be promptly notified, and access to the one or more other terminals 3 may be allowed through use of the updated account/password set.

Moreover, upon receipt of the update signal, the data synchronizing unit 314a of the terminal 3a stores the updated account/password set in the local user list 312 of the user storage unit 311a as the registered account/password set.

It is noted that, whenever one of the account/password sets stored in the registration module 31 (including the registered account/password set and the associated account/password set) and the storage module 41 is updated, a time stamp is created to be associated therewith and to show that the account/password set has been modified at a specific time.

For example, when the terminal 3a receives the update request to update the registered account/password set, and the data synchronizing unit 314a stores the updated account/password set in the local user list 311a, the terminal 3a creates a time stamp accordingly. When the server 4 receives the update signal and the account synchronizing module 42 stores the updated account/password set in the registered data entry 411a, the server 4 creates a time stamp accordingly.

This configuration may be beneficial in case that the registered account/password set stored in the user storage unit 311a is found to not conform with any of the user account/password set (s) stored in the storage module 41, due to issues such as network communication problems.

In one example, the user originally created a register account/password set (e.g., having a user account number "u0001" and a user password "1234"), which is stored in the local user list 312a, the registered data entry 411a, the associated data entry 412b, and the associated user list 313b. The user then updates the registered account/password set (e.g. the user password is changed to "5678"), using the terminal 3a. In the case where the account synchronizing module 42 of the server 4 did not receive the update signal including the updated account/password set, the registered account/password set stored in the registered data entry 411a, the associated data entry 412b, and the associated user list 313b will not be updated. The server 4 further includes a password verification module 44 that is programmed to address this issue.

Specifically, whenever one of the terminals 3 receives a user-input account/password set from the electronic device 900 in an access request that conforms with the registered account/password set stored in the local user list 311 of the one of the terminals 3, the one of the terminals 3 transmits the registered account/password set stored therein to the server 4.

In response, the password verification module 44 determines whether a registered account number of the registered account/password set conforms with a user account number of the user account/password set stored in the storage module 41 and associated with the one of the terminals 3. When the determination is affirmative, the password verification module 44 compares a registered password of the registered account/password set with a user password of the user account/password set. When it is determined that the registered password of the registered account/password set does not conform with the user password of the user account/password set, the account synchronizing module 42 performs a supplemental update operation.

In the above example, when the user attempts to access the terminal 3a using the updated account/password set as the user-input account/password set (i.e., an input account number of "u0001", and an input password of "5678") where the updated account/password set is stored in the local user list 312a as the registered account/password set, the access control module 33a deems that the user-input account/password set in authentic, and allows access of the controlling module 34a by the electronic device 900. The access control module 33a is programmed to further transmit the updated account/password set along with a corresponding time stamp to the password verification module 44.

Upon receiving the updated account/password set, the password verification module 44 is programmed to determines whether the user password of that user account/password set stored in the registered data entry 411a is "5678", and is further programmed to search the storage module 41 for the associated data entry 411b for the user account number "u0001". If such a user account number is located, the password verification module 44 determines whether the linked password of that linked account/password set in the associated data entry 411b is "5678".

In this case, since the user password stored in the registered data entry 411a and a linked password of the linked account/password set stored in the associated data entry 412b are both "1234", the account synchronizing module 42 performs the supplemental update operation. Specifically, the account synchronizing module 42 determines whether an updated password of the updated account/password set received from the terminal 3a is newer than the user password and the linked password by examining the time stamps associated therewith.

When it is determined that the updated password of the updated account/password set is indeed newer than the user password of the user account/password set stored in the registered data entry 411a and newer than an associated password of the associated account/password set stored in the associated data entry 412b, the account synchronizing module 42 replaces the user password and the associated password with the updated password. On the other hand, when it is determined that the user password is last modified later than the input password, the account synthesizing module 42 controls the input one of terminals 3a to replace the input password of the user-input account/password set with the user password. In this case, the user-input account/password set is last modified later, and the account synthesizing module 42 replaces the user password (1234) with the input password (5678).

In another case where the registered account/password set stored in the local user list 312a of the terminal 3a has been updated, but the associated account/password set stored in the associated user list 313b of the terminal 3b has failed to be updated (because, for example, the terminal 3b did not receive the update signal), when the user attempts to access the terminal 3b using the updated account/password set of u0001/5678 as the user-input account/password set, the access control module 33b deems that the user-input account/password set is not authentic (because the user-input account/password set does not conform with the associated account/password set stored in the associated user list 313b), and transmits the user-input account/password set and the associated account/password set stored in the associated user list 313b along with a corresponding time stamp to the password verification module 44.

The password verification module 44 then performs the supplemental update operation when it is determined that the user-input account/password set (u0001/5678) conforms with the linked account/password set stored in the associated data entry 412b. In this case, the password verification module 44 determines that the linked password of the linked account/password set stored in the associated data entry 412b is newer than the associated password of the associated account/password set received from the terminal 3b, and controls the terminal 3b to replace the associated password of the associated account/password set stored in the associated user list 313b with the input password of the user-input account/password sets. Afterward, the password verification module 44 transmits a notification to the terminal 3b, which forwards the same to the electronic device 900, notifying the user that the associated password stored in the terminal 3b has been updated, and the terminal 3b allows the electronic device 900 to access the controlling module 34b.

On the other hand, when it is determined by the password verification module 44 that the user-input account/password set does not conform with any one of the user account/password sets stored in the server 4, the password verification module 44 notifies the electronic device 900 via the terminal 3b that the user-input account/password set is incorrect, and the electronic device 900 is denied access.

To sum up, the smart remote control system as described in the disclosure employs the server 4 to manage the plurality of the terminals 3 which may be disposed at separate, or even remote, locations, and to allow the user, by way of performing the association operation, to use the same account/password set to access one or more of the terminals 3 with which the user did not create a registered account/password set.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A smart remote control system comprising:
a plurality of terminals programmed to communicate with an electronic device, each of said terminals being configured to be coupled to an appliance and to store a registered account/password set therein, and being accessible by the electronic device through use of the registered account/password set so as to allow the electronic device to control and monitor the appliance; and a server coupled to said terminals and programmed to store a plurality of user account/password sets associated with said terminals, respectively, wherein, an initiating one of said terminals, upon receipt of an association request and an incoming account/password set from the electronic device, operates to transmit an association signal and the incoming account/password set to said server, the association request being transmitted by a user operating the electronic device;

wherein said server, upon receipt of the association signal and the incoming account/password set, operates to determine whether the incoming account/password set conforms with one of the user account/password sets stored therein, and to perform an association operation so as to enable the initiating one of said terminals to be accessible by the electronic device through use of the incoming account/password set when the determination is affirmative;

wherein each of said terminals includes a registration module, said registration module being programmed to allow user input for creation of the registered account/password set, to store the registered account/password set, and to transmit the registered account/password set to said server;

upon receipt of the registered account/password set, said server is programmed to store the registered account/password set as one of the user account/password sets that is associated with one of said terminals from which said server receives the registered account/password set;

in the association operation, said server is programmed to enable said registration module of the initiating one of said terminals to store the incoming account/password set as an associated account/password set;

wherein said server includes an association module, an account synchronizing module and a storage module, said storage module having a plurality of registered data entries for storing respectively the user account/password sets, and a plurality of associated data entries associated respectively with said terminals;

the association operation is performed when it is determined by said server that the incoming account/password set is stored in one of the plurality of registered data entries;

the association operation includes said association module of said server associating the incoming account/password set with the initiating one of said terminals, and said account synchronizing module storing the incoming account/password set in one of the plurality of associated data entries associated with the initiating one of said terminals as a linked account/password set;

wherein each of said terminals includes an identification verifying module, and an access control module;

when the association request is received by said access control module of the initiating one of said terminals, said identification verifying module of the initiating one of said terminals that has received the association request generates a verifying code, and said access control module receives a user-input code;

the initiating one of said terminals further transmits the user-input code and the verifying code to said server; and said server performs the association operation after it is determined that the user-input code conforms with the verifying code.

2. The smart remote control system of claim 1, wherein:

said registration module of each of said terminals includes a user storage unit and a data synchronizing unit, said user storage unit storing therein the registered account/password set and the associated account/password set stored by the association operation;

when an updating one of said terminals receives, from the electronic device, an update request indicating a request for updating the registered account/password set, said data synchronizing unit of the updating one of said terminals stores the update request and transmits to said account synchronizing module of said server an update signal including an updated account/password set, and said account synchronizing module stores the updated account/password set as the user account/password set in one of the registered data entries associated with the updating one of said terminals, and transmits the update signal to the initiating one of said terminals with which the association operation has been performed for the registered account/password set of the updating one of said terminals;

upon receipt of the update signal, said data synchronizing unit of the initiating one of said terminals stores the updated account/password set in said user storage unit as the associated account/password set.

3. The smart remote control system of claim 2, wherein:

each of said terminals further includes an association clearance unit programmed to delete the associated account/password set stored in said user storage unit, and to transmit an association clearance signal to said account synchronizing module of said server;

upon receipt of the association clearance signal, said account synchronizing module deletes the linked account/password set stored in one of the plurality of associated data entries associated with one of said terminals from which said server receives the association clearance signal.

4. The smart remote control system of claim 1, wherein:

said server includes a password verification module and a storage module, said storage module having a plurality of registered data entries for storing respectively the user account/password sets, and a plurality of associated data entries associated respectively with said terminals;

upon receipt of the registered account/password set from an input one of said terminals which receives a user-input account/password set that conforms with the registered account/password set, said password verification module determines whether a registered account number of the registered account/password set conforms with a user account number of one of the user account/password sets that is stored in said storage module and that is associated with the input one of said terminals;

when it is determined that the registered password of the registered account/password set conforms with the user password of the one of the user account/password sets, said password verification module compares a registered password of the registered account/password set with a user password of the one of the user account/password sets; and when it is determined that the registered password of the registered account/password set does not conform with the user password of the one of the user account/password sets, said password verification module performs a supplemental update operation.

5. The smart remote control system of claim 4, wherein in the supplemental update operation, said password verification module is programmed to:

replace the user password, when it is determined that the registered password of the registered account/password set is newer than the user password of the one of the user account/password sets, with the registered password.

6. The smart remote control system of claim 1, wherein each of said terminals includes a controlling module for controlling and monitoring the appliance coupled thereto.

* * * * *